United States Patent [19]

Roberts

[11] 4,372,595
[45] Feb. 8, 1983

[54] AUTOMOBILE BUMPER

[76] Inventor: Gary P. Roberts, 4303 Hanover Ter., Marshall, Tex. 75670

[21] Appl. No.: 252,939

[22] Filed: Apr. 10, 1981

[51] Int. Cl.³ ............................................. B60R 19/02
[52] U.S. Cl. .................................. 293/131; 293/132; 293/137
[58] Field of Search ............... 293/131, 132, 135, 102, 293/137

[56] References Cited

U.S. PATENT DOCUMENTS

| | | | |
|---|---|---|---|
| 958,420 | 5/1910 | McGregor | 293/131 |
| 968,800 | 8/1910 | Randerson | 293/118 |
| 992,228 | 5/1911 | McGregor | 293/131 |
| 1,257,380 | 2/1918 | Newton | 293/131 |
| 3,068,039 | 12/1962 | Barenyi | 296/28 |
| 3,795,392 | 3/1974 | Nemec | 267/140 |
| 4,109,899 | 8/1978 | Takatsu | 267/140 |

Primary Examiner—Joseph F. Peters, Jr.
Assistant Examiner—John A. Carroll
Attorney, Agent, or Firm—Dennis T. Griggs

[57] ABSTRACT

A resiliently mounted automobile bumper which effectively absorbs frontal impact shock by compressive deformation of an energy absorbing material, and tilts or skews during oblique and/or bottoming impact, such as the impact which often results during passage over irregular terrain. The bumper is pivotally mounted at either end by a pair of individually pivoting support arms, and spring loaded against a pair of impact arms. Impact surfaces on the support arms and the impact arms are constructed of an energy absorbing material. Non-frontal impact pivots the bumper assembly away from the impact arms against the loading springs, and a mechanical governor assembly controls the bumper's return to the static position while assuring proper placement of the impact arms.

12 Claims, 4 Drawing Figures

AUTOMOBILE BUMPER

BACKGROUND OF THE INVENTION

This invention relates to shock absorbing automobile bumpers, and more particularly to automobile bumpers designed to receive non-frontal impact without incurring substantial damage.

DESCRIPTION OF THE PRIOR ART

Flexible automobile bumpers have been known in the art almost as long as the automobile itself. Early attempts at creating such a flexible bumper system utilized a bumper which, when contacted in a frontal manner, collapsed or raised back toward the automobile, against the pressure of a spring or other biasing device. While these systems did prevent damage to the automobile and whatever object was struck, as with the vast majority of modern bumper systems, they were quite deficient during non-frontal impact.

More recent attempts at correction of this problem have utilized a large cap-like element which covers substantially an entire end of the car, and a large gap in the outer sheet metal of the car to allow the cap-like bumper to pivot into the body of the car during collisions. Such a bumper provides protection from non-frontal impacts by utilizing a cross connected pair of links and shock absorber to mitigate the primary shock of collision. While that bumper arrangement allows a non-frontal impact to be absorbed, such non-frontal impact must be co-planar with the bumper structure to be efficiently absorbed.

SUMMARY OF THE INVENTION

It is, therefore, an object of this invention to provide an improved automobile bumper.

It is another object of this invention to provide an improved automobile bumper suitable for protecting an automobile from non-frontal impacts.

It is yet another object of this invention to provide an improved automobile bumper capable of withstanding oblique and/or bottoming impacts without incurring substantial damage.

The foregoing objects are achieved as is now described. An automobile bumper is resiliently mounted in a manner which will effectively absorb frontal impact shock by compressive deformation of an energy absorbing material. The bumper is mounted in a manner which permits tilting or skewing during non-frontal impact, such as that impact which often results during passage over irregular terrain. The bumper is pivotally mounted at either end by a pair of pivoting support arms and is spring loaded against a pair of impact arms. Impact surfaces on the support arms and the impact arms are constructed of an energy absorbing material in the disclosed embodiment. Non-frontal impact pivots the bumper assembly away from the impact arms against the loading springs, and a mechanical governor assembly is utilized to control the bumper's return to the static position while assuring proper placement of the impact arms.

BRIEF DESCRIPTION OF THE DRAWINGS

The novel features believed characteristic of the invention are set forth in the appended claims. The invention itself as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
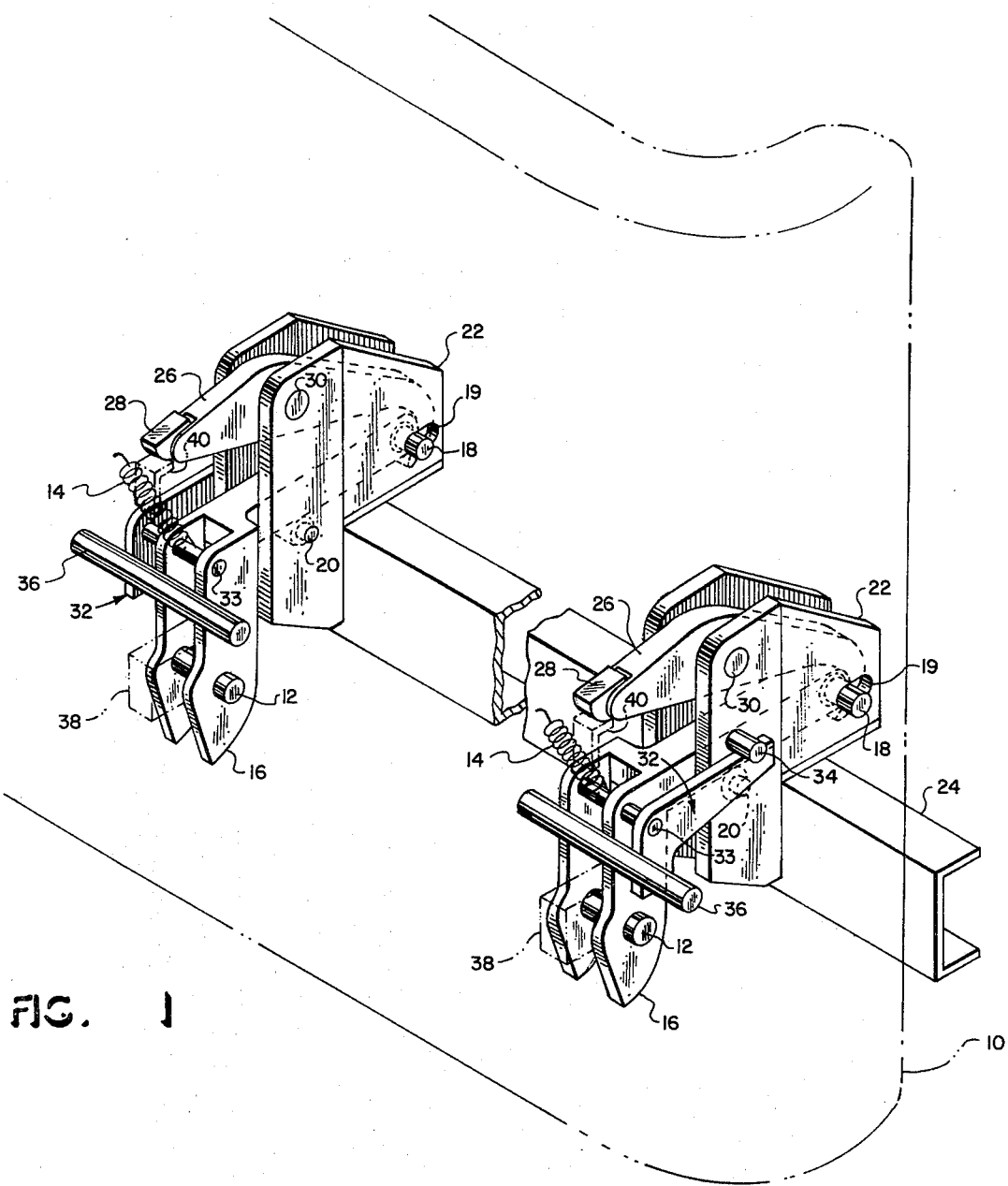
FIG. 1 is a diagrammatic perspective view of the mounting assembly of the bumper of the present invention.

With reference now to the figures and in particular to FIG. 1, there is depicted a diagrammatic view of the mounting assembly of the automobile bumper of the present invention.

FIG. 1 shows a bumper 10, depicted in phantom lines, in order that the mounting assembly might be clearly shown. Bumper 10 is shown pivotally mounted to support arms 16 by means of master pivots 12 and brackets 38.

One end of each of support arms 16 is resiliently mounted in support brackets 22 via sliding pivot 18 in aperture 19. Aperture 19 is designed to allow for an elastic deformation of a shock absorbing material. Sliding pivot 18 may be mounted within an elastic bushing, and/or, the concave end of impact arms 26 may contain an elastic or shock absorbing material.

Support arms 16 are also mounted above support pins 20, in such a manner that an upwardly directed impact will allow the support arms to pivot upward on sliding pivot 18; however, the downward travel of support arms 16 is limited by the position of support pins 20.

Bumper 10 is depicted as biased in a rearward direction utilizing loading springs 14. While the embodiment disclosed demonstrates this biasing technique utilizing loading springs 14, it should be apparent to those ordinarily skilled in the art that any similar method of maintaining bumper position will be within the intended scope of the invention.

Loading springs 14 are utilized to maintain bumper 10 in a resting position against impact absorbers 28 and impact arms 26. Impact arms 26 are mounted via pivot 30 and support bracket 22. Impact absorber 28 is depicted as constructed of an impact absorbing resilient material, such as, for example, rubber, neoprene or elastic. In an alternate embodiment, impact absorbers 28 may, as a matter of design choice, be implemented utilizing a hydraulic cylinder or shock absorber type device. Impact absorber 28, in the static state of the bumper assembly, is positioned above upstop 40, depicted in phantom lines as a portion of bumper 10.

Mechanical governor 32 is mounted to each support arm 16 via pivot 33. Mechanical governor 32 is utilized to assure proper realignment of the bumper mounting mechanism after an upward impact. Mechanical governor 32 operates in conjunction with fixed stop 34 and bumper stop 36 to prevent misalignment of the bumper mounting assembly in a manner which will be explained with respect to FIG. 4.

Figure 2:
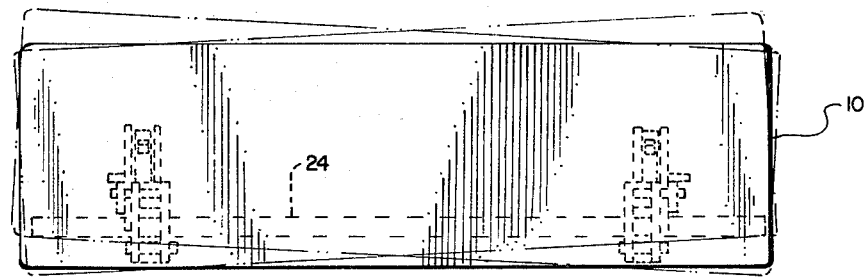
FIG. 2 is a frontal view showing the skewing capability of the bumper of the present invention.

Referring now to FIG. 2, the possible skew action of bumper 10 is depicted. This skew action is attributable to the independent operation of support arms 16. An obliquely directed impact at either end of bumper 10 beneath master pivot 12 will raise support arm 16 at that end and allow the bumper assembly to skew in the manner depicted in FIG. 2.

Figure 3:
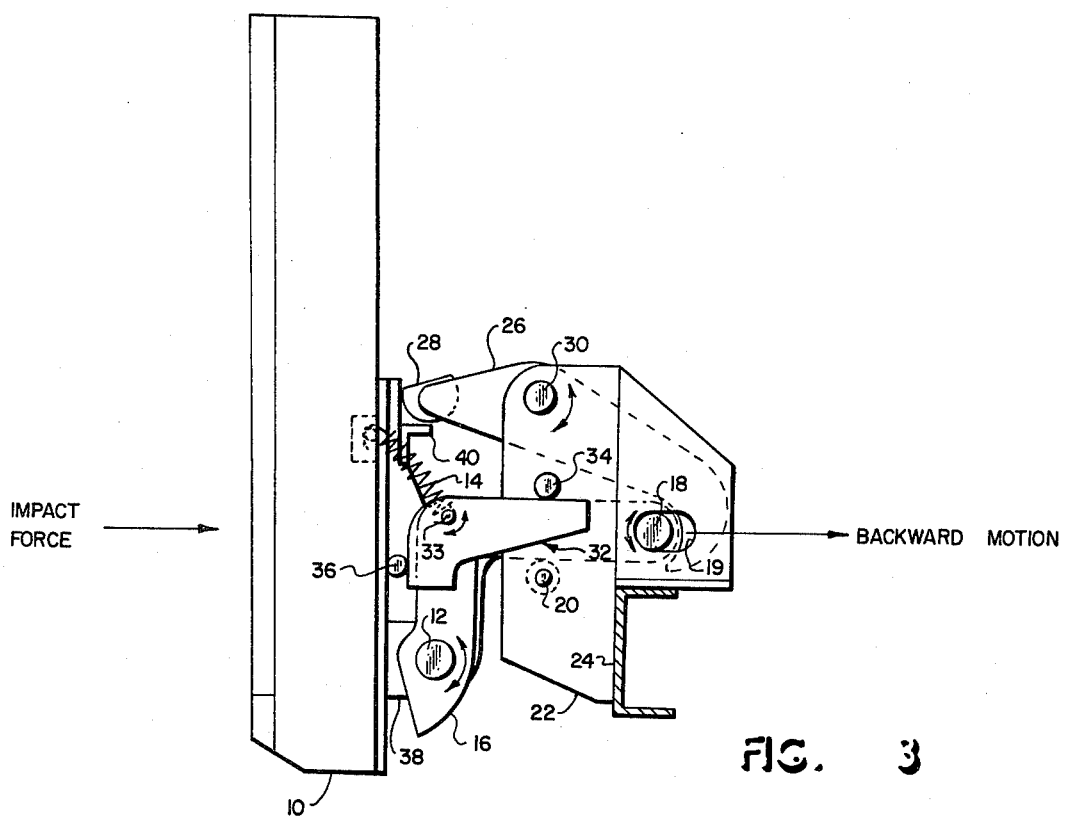
FIG. 3 is a diagrammatic side view of the bumper of the present invention.

With reference now to FIG. 3, a side view of the bumper and mounting assembly of the present invention is shown. Support bracket 22 is shown fixedly mounted to beam 24, and providing support for support arm 16 and impact arm 26. Upstop 40 is depicted supporting impact absorber 28. It should be apparent to those skilled in the art that an oblique impact on bumper 10, with upstop 40 permanently fixed below impact absorber 28, would result in possible damage to the bumper and mounting assembly, literally driving it into the ground. However, the pivoting action about master pivot 12 and sliding pivot 18, by allowing extra ground clearance, will preclude such damage (see FIG. 4).

Figure 4:
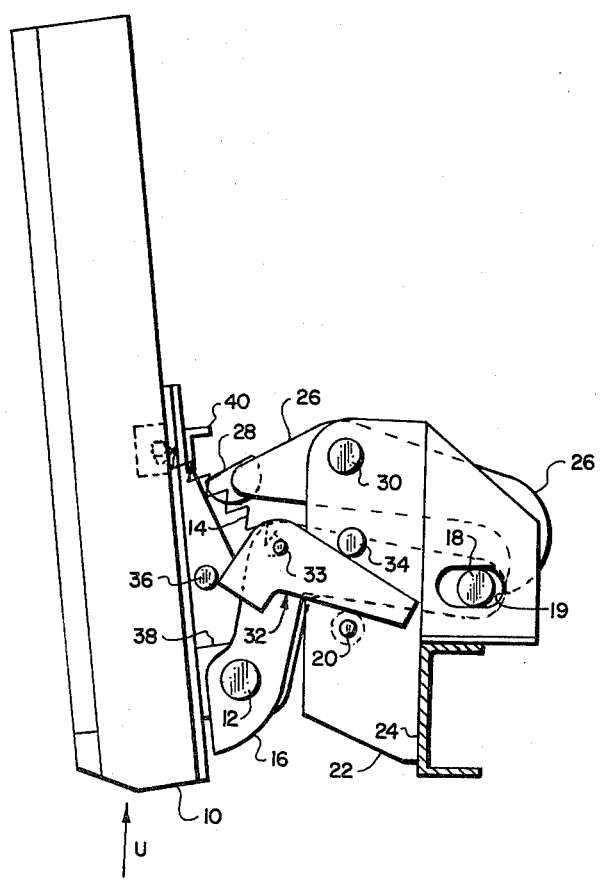
FIG. 4 is a diagrammatic side view of the bumper of the present invention during a non-frontal impact.

FIG. 4 depicts a side view of the bumper and mounting assembly of the present invention during an oblique and/or bottom impact beneath master pivot 12 such as the impact which might occur during passage over irregular or sharply canted terrain. The upward force component indicated by the arrow U in FIG. 4, is transmitted from bumper 10 to support arm 16 via bracket 38 and master pivot 12. Support arm 16 is lifted off support pin 20 and rotates clockwise about sliding pivot 18. The frontal element of the oblique force will be absorbed by an elastic deformation of the shock absorbing material surrounding sliding pivot 18, while causing bumper 10 to pivot about master pivot 12, freeing upstop 40 from beneath impact absorber 28; the vertical element will tend to lift support arm 16.

As support arm 16 lifts, mechanical governor 32, attached to support arm 16 at pivot 33, will also lift. One arm of mechanical governor 32 will contact fixed stop 34, causing a clockwise rotation of mechanical governor 32. The clockwise rotation imparted to mechanical governor 32 will cause the other arm of mechanical governor 32 to contact bumper stop 36. As mechanical governor 32 is forced into bumper stop 36, bumper 10 is pivoted farther away from impact absorber 28, keeping upstop 40 clear of impact absorber 28 despite the action of springs 14. As the upward impact lessens in strength, support arm 16 is once again lowered to its static resting position against the support pin 20. Loading springs 14 will urge bumper stop 36 into the mechanical governor arm and gradually allow realignment of upstop 40 and impact absorber 28 as in FIG. 3. It should be noted that an impact above master pivot 12 tends to force upstop 40 beneath impact absorber 28; however, backward motion of support arm 16 tends to force impact arm 26 to move about pivot 30 and thus restrain any tendency of the mechanism to lose its proper position during head-on impact.

ALTERNATE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An automobile bumper assembly comprising:
   a plurality of support brackets fixedly mountable on an automobile;
   a plurality of generally L-shaped support arms, each of said support arms resiliently mounted at a first end thereof in each one of said support brackets;
   an elongated bumper member pivotally mounted at a second end of each of said support arms, along a lower edge of said bumper member;
   a plurality of impact absorbing members, each of said impact absorbing members mounted in each one of said support brackets and including a resilient portion positioned above said pivotal mounting of said bumper member; and
   biasing means for pivoting said bumper member into contact with the resilient portion of said impact absorbing means.

2. The automobile bumper assembly according to claim 1 wherein said resilient mounting of said support arms comprises an elastic bushing surrounding a pivot.

3. The automobile bumper assembly according to claim 1 wherein said resilient portion of said impact arm comprises a rubber protuberance.

4. An automobile bumper assembly comprising:
   a plurality of support brackets fixedly mountable on an automobile;
   a plurality of generally L-shaped support arms, each of said support arms resiliently mounted at a first end thereof in each one of said support brackets;
   an elongated bumper member pivotally mounted at a second end of each of said support arms, along a lower edge of said bumper member;
   a plurality of impact absorbing members, each of said impact absorbing members conjunctively mounted with each of said support arms in each of said support brackets and including a resilient portion positioned above said pivotal mounting of said bumper member; and
   biasing means for pivoting said bumper member into contact with the resilient portion of said impact absorbing means.

5. The automobile bumper assembly according to claim 4 wherein said resilient mounting of said support arms comprises an elastic bushing surrounding a pivot.

6. The automobile bumper assembly according to claim 4 wherein said resilient portion of said impact arm comprises a rubber protuberance.

7. The automobile bumper assembly according to claim 4 wherein said conjunctive mounting comprises a resilient concave section of each of said impact absorbing members mounted in conjunction with an end of each of said support arms.

8. An automobile bumper assembly comprising:
   a plurality of support brackets fixedly mountable on an automobile;
   a plurality of generally L-shaped support arms, each of said support arms resiliently mounted at a first end thereof in each one of said support brackets;
   an elongated bumper member pivotally mounted at a second end of each of said support arms, along a lower edge of said bumper member;
   a plurality of impact absorbing members, each of said impact absorbing members conjunctively mounted with each of said support arms in each of said support brackets and including a resilient portion positioned above said pivotal mounting of said bumper member;
   biasing means for pivoting said bumper member into contact with the resilient portion of said impact absorbing means; and governor means for controlling the pivoting of said bumper member after an impact whereby proper positioning of said resilient portions of said impact absorbing members is achieved.

9. The automobile bumper assembly according to claim 8 wherein said resilient mounting of said support arms comprises an elastic bushing surrounding a pivot.

10. The automobile bumper assembly according to claim 8 wherein said resilient portion of said impact arm comprises a rubber protuberance.

11. The automobile bumper assembly according to claim 8 wherein said conjunctive mounting comprises a resilient concave section of each of said impact absorbing members mounted in conjunction with an end of each of said support arms.

12. The automobile bumper assembly according to claim 8 wherein said governor means comprises a cam surface mounted on each of said support arms.

* * * * *